United States Patent
Bell

(10) Patent No.: US 11,427,280 B2
(45) Date of Patent: Aug. 30, 2022

(54) SYSTEM AND BRAKING KIT FOR ENABLING A VEHICLE TRAILER AND A TOW BAR TO BE INTERCONNECTED IN EITHER A BRAKING OR A NON-BRAKING CONFIGURATION

(71) Applicant: Pi Manufacturing Inc., Guelph (CA)

(72) Inventor: Robert Bell, Guelph (CA)

(73) Assignee: Pi Manufacturing Inc., Guelph (CA)

( * ) Notice: Subject to any disclaimer, the term of this patent is extended or adjusted under 35 U.S.C. 154(b) by 101 days.

(21) Appl. No.: 17/148,823

(22) Filed: Jan. 14, 2021

(65) Prior Publication Data

US 2022/0219773 A1   Jul. 14, 2022

(51) Int. Cl.
*B62K 27/12* (2006.01)
*B60T 11/04* (2006.01)
*B60T 7/20* (2006.01)

(52) U.S. Cl.
CPC ............... *B62K 27/12* (2013.01); *B60T 7/20* (2013.01); *B60T 11/04* (2013.01)

(58) Field of Classification Search
CPC ........................................................ B62K 27/12
USPC ........................................................ 280/240
See application file for complete search history.

(56) References Cited

U.S. PATENT DOCUMENTS

| | | | |
|---|---|---|---|
| 4,889,212 A | 12/1989 | Temple | |
| 6,848,546 B2 | 2/2005 | Roll et al. | |
| 6,959,793 B2 | 11/2005 | Cinquemani | |
| 7,059,455 B2 | 6/2006 | Savaria | |
| 7,806,240 B2 | 10/2010 | Walstrom et al. | |
| 8,708,085 B1 | 4/2014 | Wilson | |
| 8,708,112 B2 | 4/2014 | Maisonneuve | |
| 9,108,601 B2 | 8/2015 | Lebsock | |

(Continued)

FOREIGN PATENT DOCUMENTS

| | | |
|---|---|---|
| CN | 203753343 U | 8/2014 |
| CN | 204137279 U | 2/2015 |

(Continued)

OTHER PUBLICATIONS

Cycletote, "Cycletote Automatic Brakes", Web Page, https://cycletote.com/products/automatic-brake-system-bolt-on-hub (Retrieved From Wayback Machine on Jan. 14, 2021, noted as captured Aug. 4, 2020).

*Primary Examiner* — Kevin Hurley
*Assistant Examiner* — Hosam Shabara
(74) *Attorney, Agent, or Firm* — Dickinson Wright LLP; Matthew D. Powell

(57) ABSTRACT

A system, generally for use with light personal vehicles such as bicycles or e-bikes, for enabling a vehicle trailer and a tow bar to be interconnected in either a braking configuration or a non-braking configuration, is described. Also described is a braking kit for interconnecting a tow bar and a vehicle trailer in a braking configuration, wherein the vehicle trailer comprises a connection interface dimensioned to be connected with an end of the tow bar in a non-braking configuration. When the tow bar and the trailer are interconnected in the braking configuration, at least a threshold amount of rearward force imparted via the tow bar during vehicle braking causes the actuation of at least one brake associated with the trailer wheels. The same tow bar can be used in either braking or non-braking configuration.

24 Claims, 7 Drawing Sheets

(56) References Cited

U.S. PATENT DOCUMENTS

| | | | |
|---|---|---|---|
| 9,650,104 B2 * | 5/2017 | Irwin | G05G 1/52 |
| 9,663,183 B1 | 5/2017 | Wilson | |
| 9,669,859 B2 | 6/2017 | Hansen et al. | |
| 9,840,301 B2 | 12/2017 | Barak et al. | |
| 10,206,322 B2 | 2/2019 | Gerbrandt et al. | |
| 10,427,769 B1 | 10/2019 | Garrett | |
| 10,589,582 B2 | 3/2020 | Westervelt | |
| 11,136,031 B2 * | 10/2021 | Rabbiosi | B62D 59/04 |
| 2015/0360745 A1 | 12/2015 | Irwin | |

FOREIGN PATENT DOCUMENTS

| | | | |
|---|---|---|---|
| CN | 204161593 U | 2/2015 | |
| CN | 204296997 U | 4/2015 | |
| CN | 105620638 A | 6/2016 | |
| DE | 102010051838 A1 | 5/2012 | |
| WO | WO-2008017941 A2 * | 2/2008 | B60T 1/04 |

* cited by examiner

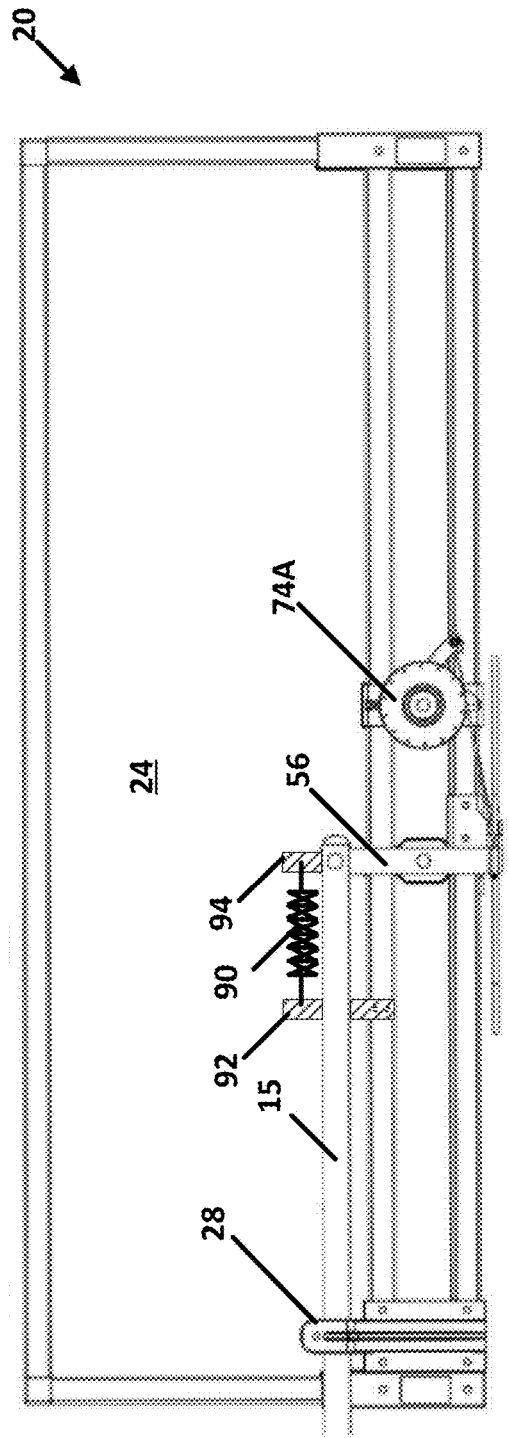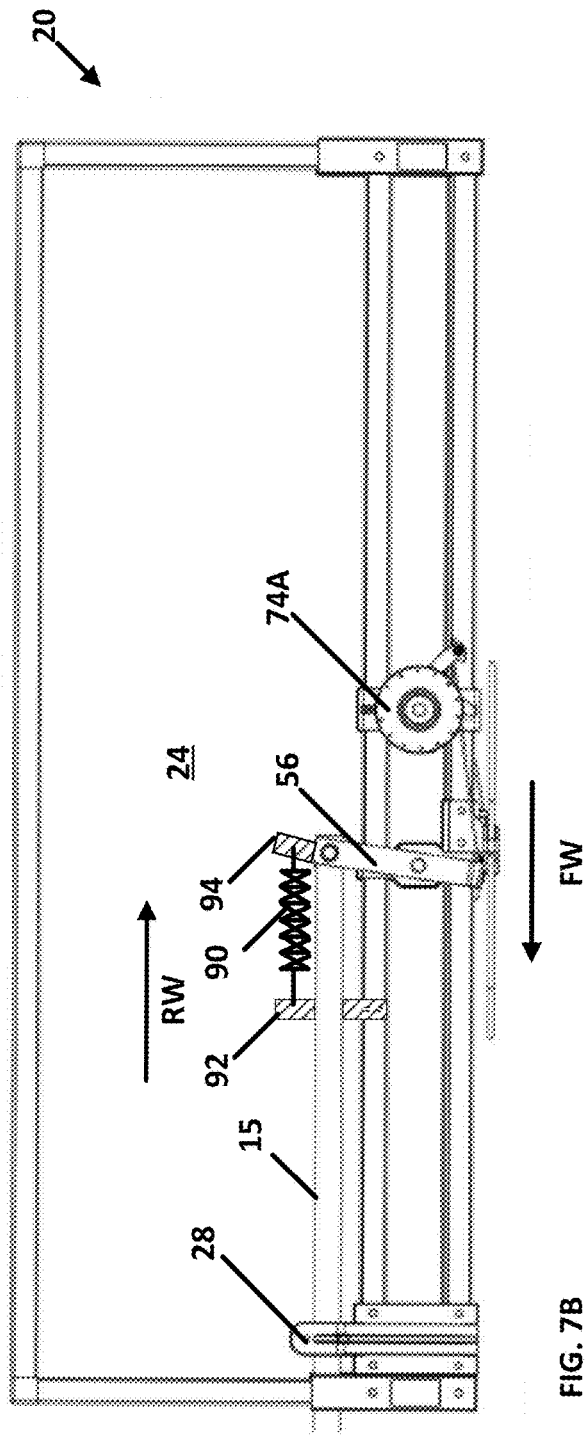

SYSTEM AND BRAKING KIT FOR ENABLING A VEHICLE TRAILER AND A TOW BAR TO BE INTERCONNECTED IN EITHER A BRAKING OR A NON-BRAKING CONFIGURATION

FIELD OF THE INVENTION

The following relates generally to vehicle trailers for light personal vehicles, and more particularly to a system and a braking kit for enabling a vehicle trailer and a tow bar to be interconnected in either a braking configuration or a non-braking configuration.

BACKGROUND OF THE INVENTION

Light personal vehicles such as bicycles, e-bikes and mopeds have long been used by individuals who wish to travel short distances for work, errands or recreation, without having to operate and arrange parking for a larger motor vehicle such as a car or minivan. One of the drawbacks of light personal vehicles is that, alone, they are generally unsuitable for transporting loads. For example, mechanical bicycles tend to offer no storage space, leaving the loads that may be carried generally limited to those that can fit into a backpack or be carried on the sides of handlebars. In order to transport more substantial loads light trailers have been made available.

Light trailers are typically interconnected with a light personal vehicle using a rigid tow bar or some other form of tether extending rearward from some point on the frame of the vehicle, such as from the seat post. While light trailers have long been in use, as the uses of light personal and trailers become more varied, there has developed a need for trailers for light personal vehicles that are suitably safe for carrying heavier loads. For example, an individual wishing to operate a small residential landscaping business within a busy city may wish to tow lawn grooming equipment, plants, soil, fertilizers and the like behind his bicycle while making his or her way from home to home. As another example, an individual wishing to operate a local window cleaning business may wish to tow ladders, fluids, buckets, personal protective equipment, and other equipment behind her e-bike. Such supplies can be very heavy in aggregate.

One consideration in developing a trailer that is suitable for carrying heavy loads is braking. It will be appreciated that a typical light personal vehicle incorporates its own braking system that is designed to provide sufficient braking power for only the vehicle and its rider. For trailers carrying light loads, the vehicle's own braking system can be sufficiently safe. However, for heavier trailer loads, the braking system designed for the light personal vehicle can be insufficient for handling braking of the overall combination of rider, trailer, heavy load and vehicle. As such, momentum built up in the trailer can overwhelm the braking system of the light personal vehicle, drastically and unsafely increasing straight line stopping distance and even causing the rear of the vehicle to be pushed unsafely off course.

While it is possible to address this problem by increasing the braking power of the light personal vehicle itself, another approach to increasing the overall braking power of the vehicle-trailer combination is to provide braking at the trailer's wheels. Some braking systems for doing this are designed to be actuated manually by a rider of the vehicle when it is felt the braking is required. Others are designed to be actuated automatically based on the motion of the trailer with respect to the vehicle. The latter systems are known as overrun or surge-braking systems.

Various surge-braking systems are available for trailers being used with light personal vehicles. For example, Cycle Tote—a manufacturer of bicycle trailers in Fort Collins, Colo.—has provided a bolt-on surge brake system for their bicycle trailers. A functional split/wishbone tow bar is attached to the seat post of the bicycle and to the trailer. The tow bar itself has a sprung piston at the seat post end that can slide axially with respect to the rest of the tow bar when the tow bar and vehicle are forced together upon deceleration. When pushed into the tow bar, the piston causes the drawing of brake cables that themselves extend from the piston all of the way back to brakes at the trailer wheels, thereby to engage the trailer's brakes.

While the Cycle Tote surge braking system is useful, it requires a specialized tow bar that incorporates the sprung piston and extends all of the way back to the trailer. The specialized tow bar is not generally usable for interconnecting the vehicle and its trailer in non-braking configuration. Interconnecting a vehicle and its trailer in a non-braking configuration, even though braking configuration may be available, might be useful to a person when simply towing a lighter load or when parts of the trailer's braking system, such as brake pads or brake cables, are under repair. As such, with the Cycle Tote surge braking system, if non-braking interconnection is desired, an entirely different tow bar must be used. Furthermore, the Cycle Tote surge braking system requires braking cables that extend all of the way rearward from about the seat post of the bicycle to the brakes. It would be useful if there were a more self-contained braking system that did not require a specialized tow bar. It would be useful for such a braking system was associated more compactly with the trailer itself, rather than requiring components such as brake cables extending all of the way rearward from the vehicle itself to the trailer's wheels.

It is an object of the following description to address the disadvantages referred to above.

SUMMARY OF THE INVENTION

According to an aspect of this description, there is provided a system for enabling a vehicle trailer and a tow bar to be interconnected in either a braking configuration or a non-braking configuration, the system comprising: a connection interface associated with the trailer and dimensioned to be connected with an end of the tow bar thereby to interconnect the tow bar and the trailer in the non-braking configuration; and a braking subsystem for interconnecting the tow bar and the trailer in the braking configuration, the braking subsystem comprising: a lever having a proximal end and a distal end, the lever at the proximal end dimensioned to be connected with the end of the tow bar; a lever fulcrum intermediate the proximal end and the distal end, the lever fulcrum dimensioned to be connected with the connection interface; and at least one brake associated with the distal end of the lever and with a respective wheel of the trailer, wherein, while the trailer and the tow bar are interconnected in the braking configuration, at least a threshold amount of rearward force imparted via the tow bar towards the proximal end of the lever causes the lever to pivot about the lever fulcrum while being retained by the connection interface thereby to move the distal end of the lever and actuate the at least one brake.

In an embodiment, the end of the tow bar comprises a tow bar aperture; and the connection interface comprises a connection post dimensioned to be received and retained within the tow bar aperture in the non-braking configuration; a lever post extends from a proximal end of the lever and is dimensioned to be received and retained within the tow bar aperture in the braking configuration; and the lever fulcrum comprises a fulcrum aperture dimensioned to receive and retain the connection post in the braking configuration.

In an embodiment, the at least one brake is connected to the distal end of the lever via a mechanical link.

In an embodiment, the mechanical link comprises at least one cable anchored to the distal end of the lever and to a corresponding base plate of a respective brake.

In an embodiment, the system comprises a spring associated with the lever for transmitting rearward force to the vehicle trailer and resisting pivoting of the lever about the lever fulcrum until the threshold amount of rearward force is achieved.

In an embodiment, the spring is associated with the proximal end of the lever.

In an embodiment, the spring is associated with the distal end of the lever.

In an embodiment, the spring is a compression spring.

In an embodiment, the spring is an extension spring.

In an embodiment, the system further comprises a tow bar bracket associated with the trailer for supporting the tow bar between a towing vehicle and the end of the tow bar.

In an embodiment, the system further comprises a lever stop limiting an extent of pivoting of the lever about the lever fulcrum when forward force is imparted via the tow bar to the proximal end of the lever.

In an embodiment, a tow bar post extends from the end of the tow bar; the connection interface comprises a connection aperture dimensioned to receive and retain the tow bar post in the non-braking configuration; the proximal end of the lever comprises a lever aperture dimensioned to receive and retain the tow bar post in the braking configuration; and the lever fulcrum comprises a fulcrum post dimensioned to be received and retained within the connection aperture in the braking configuration.

In accordance with another aspect, there is provided a braking kit for interconnecting a tow bar and a vehicle trailer in a braking configuration, wherein the vehicle trailer comprises a connection interface dimensioned to be connected with an end of the tow bar in a non-braking configuration, the braking kit comprising: a lever having a proximal end and a distal end, the lever at the proximal end dimensioned to be connected with the end of the tow bar; a lever fulcrum intermediate the proximal end and the distal end, the lever fulcrum dimensioned to be connected with the connection interface; and at least one brake associated with the distal end of the lever and with a respective wheel of the trailer, wherein, while the trailer and the tow bar are interconnected in the braking configuration, at least a threshold amount of rearward force imparted via the tow bar towards the proximal end of the lever causes the lever to pivot about the lever fulcrum while being retained by the connection interface thereby to move the distal end of the lever and actuate the at least one brake.

In an embodiment, the end of the tow bar comprises a tow bar aperture and the connection interface comprises a connection post dimensioned to be received and retained within the tow bar aperture in the non-braking configuration; a lever post extends from a proximal end of the lever and is dimensioned to be received and retained within the tow bar aperture in the braking configuration; and the lever fulcrum comprises a fulcrum aperture dimensioned to receive and retain the connection post in the braking configuration.

In an embodiment, the at least one brake is connectable to the distal end of the lever via a mechanical link.

In an embodiment, the mechanical link comprises at least one cable anchorable to the distal end of the lever and to a corresponding base plate of a respective brake.

In an embodiment, a spring is associated with the lever for transmitting rearward force to the vehicle trailer and resisting pivoting of the lever about the lever fulcrum until the threshold amount of rearward force is achieved.

In an embodiment, the spring is associated with the proximal end of the lever.

In an embodiment, the spring is associated with the distal end of the lever.

In an embodiment, the spring is a compression spring.

In an embodiment, the spring is an extension spring.

In an embodiment, the braking kit further comprises a tow bar bracket associated with the trailer for supporting the tow bar between a towing vehicle and the end of the tow bar.

In an embodiment, the braking kit further comprises a lever stop for limiting an extent of pivoting of the lever about the lever fulcrum when forward force is imparted via the tow bar to the proximal end of the lever.

In an embodiment, a tow bar post extends from the end of the tow bar and the connection interface comprises a connection aperture dimensioned to receive and retain the tow bar post in the non-braking configuration; the proximal end of the lever comprises a lever aperture dimensioned to receive and retain the tow bar post in the braking configuration; and the lever fulcrum comprises a fulcrum post dimensioned to be received and retained within the connection aperture in the braking configuration.

It will be appreciated that according to this description, in braking configuration, the force of inertia of the trailer on the vehicle triggers application of brakes of a braking system associated with the trailer, without requiring use of a specialized tow bar. In particular, the same tow bar can be interconnected with the trailer in either braking or non-braking configurations. As such, the braking subsystem can be provided as a kit that can be installed on, and that is more compactly associated with, the trailer itself, without any modifications of the vehicle or the tow bar that extends from the vehicle to the trailer.

Other aspects and advantages will be apparent upon reading the following.

BRIEF DESCRIPTION OF THE DRAWINGS

Embodiments of the invention will now be described with reference to the appended drawings in which:

FIG. 7A is a side elevation view of the trailer with just the hub of the left trailer wheel pictured, the tow bar, and the tow bar interface in a braking configuration, during non-braking activity;

FIG. 7B is a side elevation view of the trailer with just the hub of the left trailer wheel illustrated, along with the tow bar, and the tow bar interface in a braking configuration, during braking activity.

DETAILED DESCRIPTION

Figure 1:
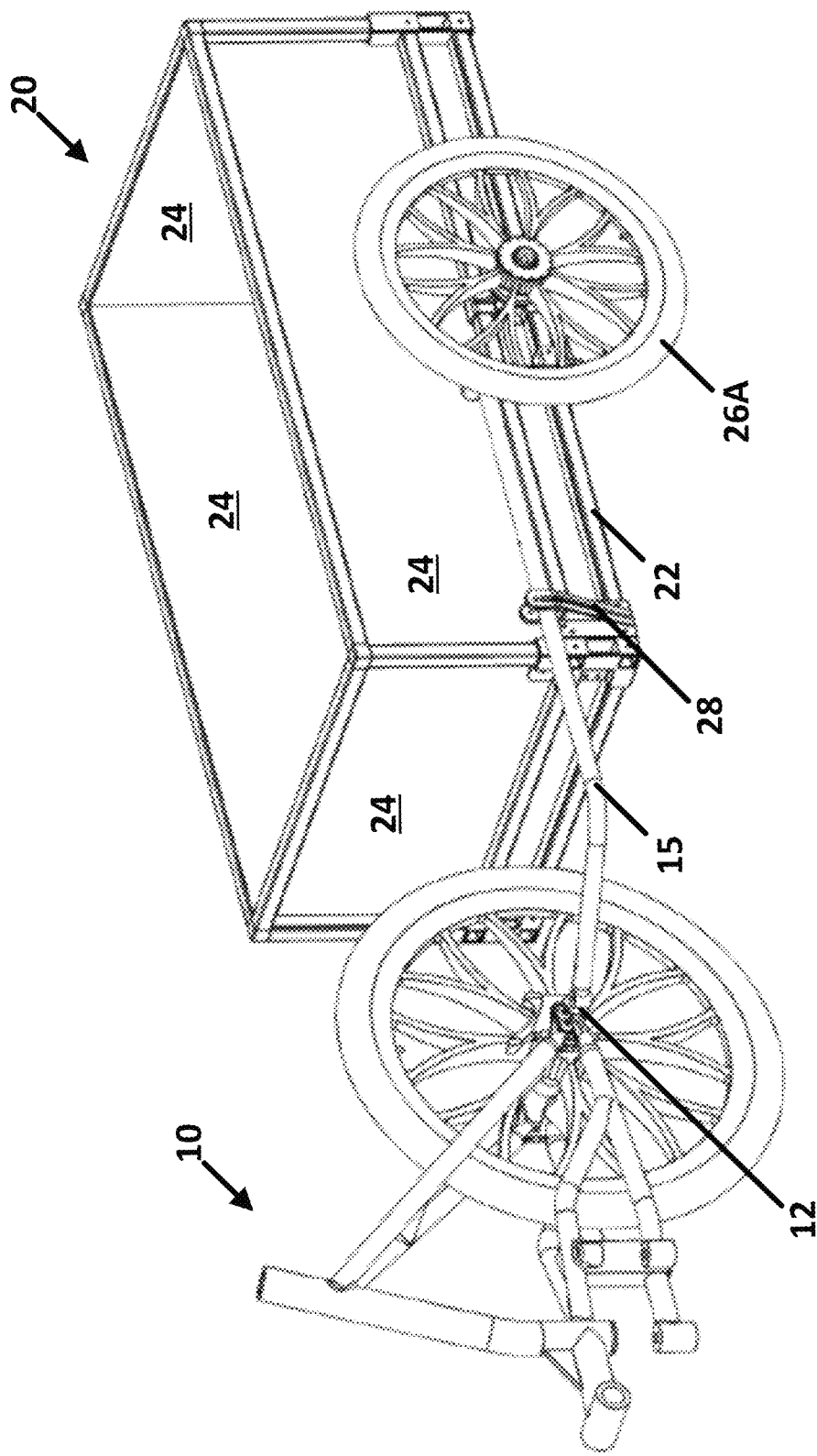
FIG. 1 is a front perspective view of a rear portion of a vehicle and a trailer linked via a tow bar in a braking configuration, according to an embodiment.
Figure 2:
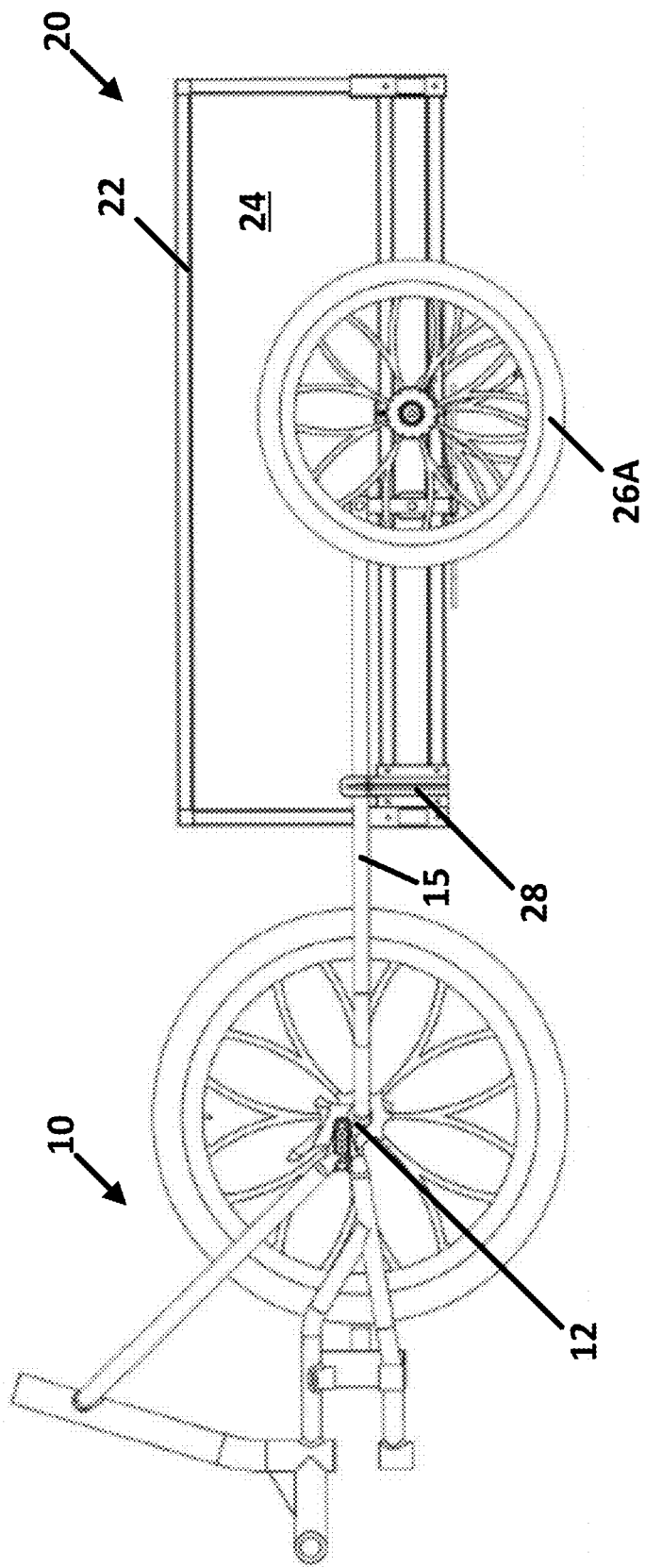
FIG. 2 is a side elevation view of the rear portion of the vehicle and connected trailer of FIG. 1.

FIG. 1 is a front perspective view of a rear portion of a vehicle 10 and a trailer 20 linked via a tow bar 15 in a braking configuration, in particular a surge-braking configuration, according to an embodiment. FIG. 2 is a side elevation view of the rear portion of the vehicle 10 and connected trailer 20. In this embodiment, vehicle 10 is a mechanical pedal bicycle, and tow bar 15 is a standard rigid bar extending from a connection point 12 associated with a rear axle of vehicle 10. In this embodiment, tow bar 15 may be manually unlinked from connection point 12 as desired by a user of vehicle 10. However, in other embodiments tow bar 15 may be somewhat more permanently affixed at connection point 12 or at another point on vehicle 10. In other embodiments, vehicle 10 may be an e-bike, a motor bike, a moped, or some other vehicle suitable for towing a trailer such as trailer 20. The below describes a system for interconnecting tow bar 15 with trailer 20 in either braking or non-braking configurations, and is not concerned particularly with the type of vehicle 10 to which tow bar 15 is itself connected, nor the manner in which tow bar 15 is connected to vehicle 10.

In this embodiment, a tow bar aperture 18 extends through a distal end 17 of tow bar 15 for enabling tow bar 15 to be interconnected with trailer 20 in either braking or non-braking configurations, as will be described. In this embodiment, trailer 20 has a frame 22 formed of interconnected bars, to which side, rear, front and bottom panels 24 are affixed. In this embodiment, two wheels 26A and 26B extend from frame 22 on opposite sides of trailer 20. A tow bar bracket 28 is connected to frame 22 towards the front of trailer 20 to support tow bar 15 between vehicle 10 and end 17 of tow bar 15. Tow bar bracket 28 allows tow bar 15 to slide axially with respect to trailer 20 while vertically supporting tow bar 15, when tow bar 15 and trailer 20 are interconnected in the braking configuration, as will be described.

Figure 3:
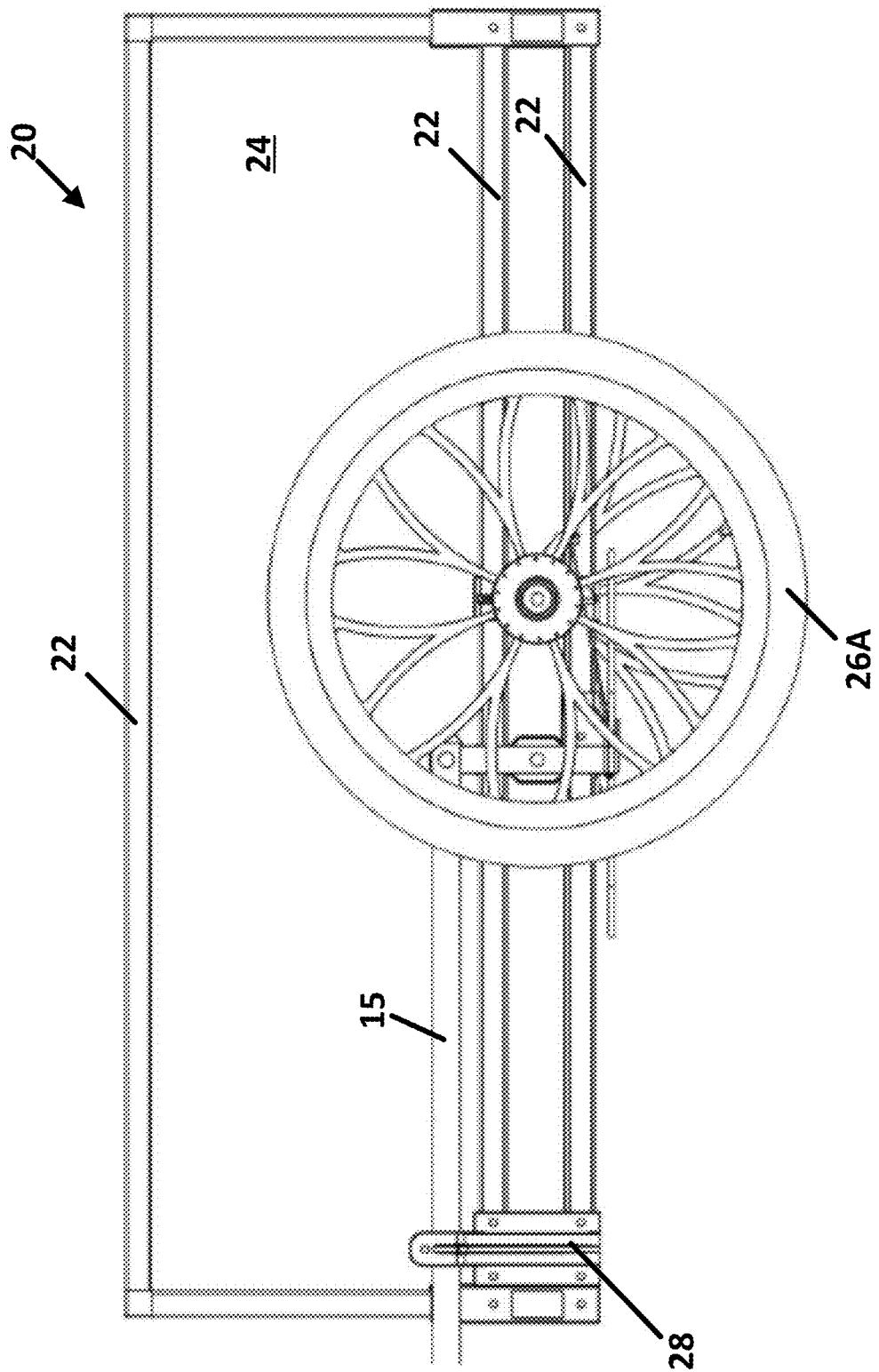
FIG. 3 is a magnified side elevation view of just the trailer and tow bar of FIG. 1.
Figure 4:
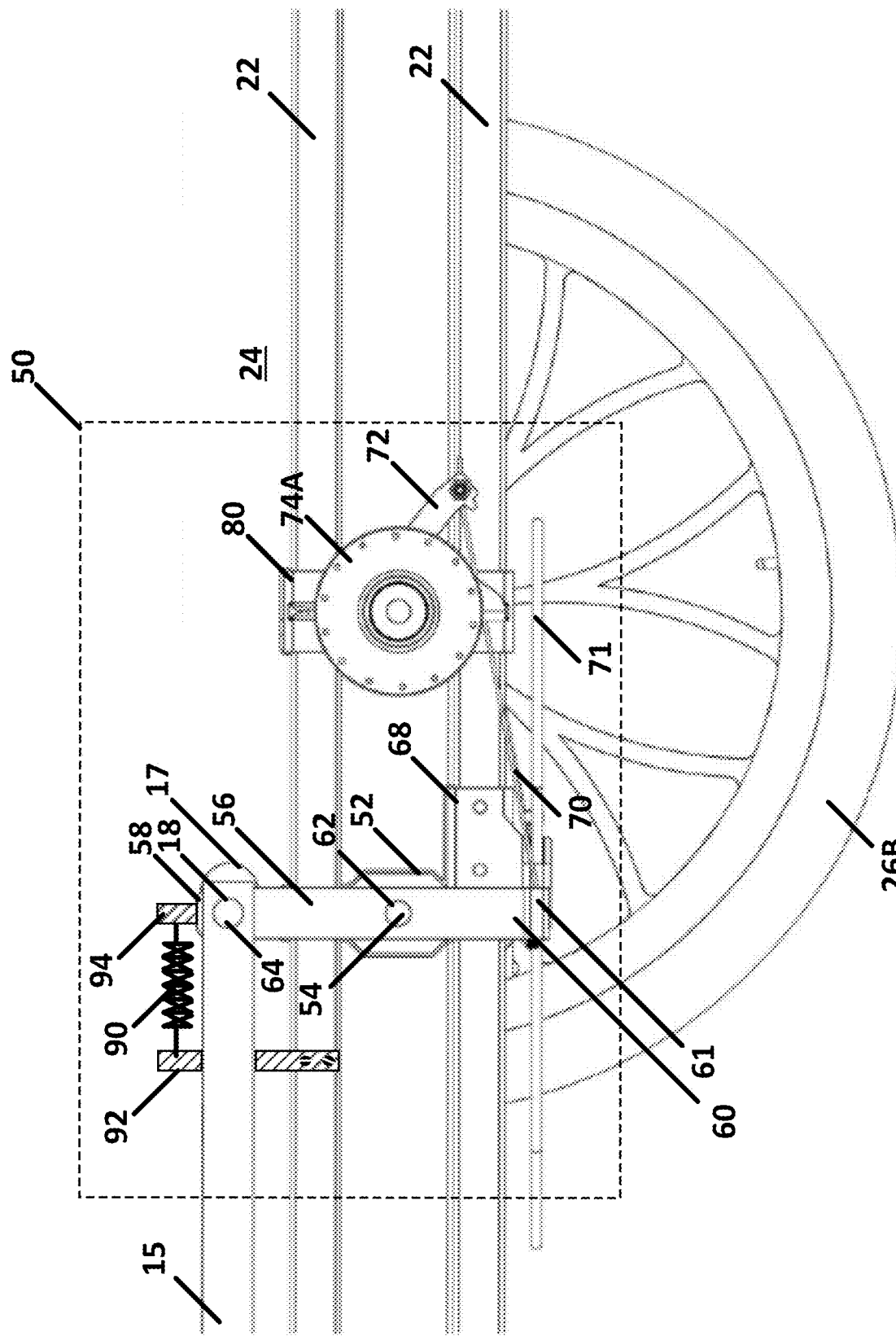
FIG. 4 is another magnified side elevation view of the tow bar and tow bar interface of FIG. 1, with the right trailer wheel and just the hub of the left trailer wheel pictured.

FIG. 3 is a magnified side elevation view of trailer 20 and tow bar 15, and FIG. 4 is another magnified side elevation view of trailer 20 and tow bar 15 with all but a wheel hub 74A of left trailer wheel 26A having been removed for ease of illustration. Trailer 20 includes a connection interface 52 that, in this embodiment, is attached between two parallel rails of frame 22. Connection interface 52 is useful for interconnecting tow bar 15 and trailer 20 in both non-braking and braking configurations. For example, connection interface 52 includes a connection post 54 extending laterally (out of the page in FIG. 4) that can be received and retained within tow bar aperture 18 of tow bar 15 to thereby interconnect tow bar 15 and trailer 20 in the non-braking configuration (not shown). In this non-braking configuration, connection post 54 can be retained within tow bar aperture 18 with a cotter pin (not shown) passing through a distal tip of connection post 54. Other techniques for such retention are possible.

In this embodiment, and as shown, a braking subsystem 50 is provided for interconnecting tow bar 15 and trailer 20 in a braking configuration. As shown in FIG. 4, tow bar 15 and trailer 20 have been interconnected such that connection post 54 of connection interface 52 has been received and retained within a lever 56, and not within tow bar aperture 18. More particularly, lever 56 has a proximal end 58 and a distal end 60, and a fulcrum aperture 62 extending through lever 56 at a position that is intermediate proximal end 58 and distal end 60. In the braking configuration, fulcrum aperture 62 receives and retains connection post 54 of connection interface 52. In this braking configuration, connection post 54 can be retained within fulcrum aperture 62 with a cotter pin (not shown) passing through the distal tip of connection post 54. Other techniques for such retention are possible.

A lever post 64 extends from proximal end 58 of lever 56 and, in the braking configuration, is received within tow bar aperture 18. Lever post 64 can be retained within tow bar aperture 18 with a cotter pin passing through the distal tip of lever post 64. Other techniques for such retention are possible. At the distal end 60 of lever 56 is an anchor 61 that anchors a brake cable 70, which itself extends from distal end 60 of lever 56 to a left brake base plate 72. Left brake base plate 72 is, in turn, biased to an unbraked condition but can, if brake cable 70 is drawn by movement of distal end 60 of lever 56 towards the front of trailer 20, apply braking to the wheel axle extending to wheel hub 74 from a wheel connector 80 spanning the above-mentioned rails of frame 22.

In this embodiment, another brake cable 71 is anchored to distal end 60 of lever 56, and extends from distal end 60 of lever 56, underneath trailer 20, to a right brake base plate (not shown). The right brake base plate engages a right brake (not shown) associated with a corresponding hub of right wheel 26B in a similar manner to left brake base plate 72.

A lever stop 68 is affixed to frame 22 at a position adjacent to lever 56 opposite lever 56 from the front of trailer 20. In this embodiment, lever stop 68 prevents lever 56 from pivoting off about vertical when forward force is imparted via tow bar 15 to the proximal end 58 of lever 56. As such, lever stop 68 prevents distal end 60 from pivoting father rearward than the vertical position shown in FIGS. 3 and 4, thereby to enable tow bar 15 to pull trailer 20 while lever 56 remains about vertical.

A spring 90 is anchored at one of its ends to a frame anchor 92 and at its other end to an extension 94 at proximal end 58 of lever 56. In turn, frame anchor 92 is attached to frame 22. In this embodiment, spring 90 is an extension spring that is so arranged to resist pivoting of lever 56 about fulcrum aperture 62 in response to rearward force applied via tow bar 15 until at least a threshold amount of rearward force has been achieved.

Resisting pivoting of lever 56 until a threshold amount of rearward force has been applied via tow bar 15 enables braking subsystem 50 to resist braking when force that is less than the threshold amount is applied rearward via tow bar 15. Such a lesser force will tend to occur when a user of vehicle 10—a pedal bicycle in this embodiment—is oscillating in speed as it accelerates while towing trailer 20. Resistance to braking is useful when a rider of vehicle 10 is pedaling hard to accelerate—biopacing—thereby causing slight changes in the distance between vehicle 10 and trailer 20 as momentum is being gained. For example, a user upon pumping a pedal of vehicle 10 when beginning to pedal from a standstill will cause vehicle 10 to surge forwardly somewhat and accordingly pull trailer 20. Between pedal pumps at this initial speed vehicle 10 will slightly slow down, but trailer 20 will tend to continue forwardly as vehicle slightly slows, resulting in rearward force being applied via tow bar 15. It is these initial, smaller, rearward forces that spring 90 fully conveys, by its resistance to extending, to frame anchor 92 rather than to proximal end 58 of lever 56. In this way, at these slower speeds and accordingly lesser rearward forces, trailer 20 will closely track the speed of vehicle 10 without brakes being applied. In this manner, with the lower rearward forces, interconnection in a braking configuration behaves similarly to interconnection in a non-braking configuration. However, as will be described further below, once the rearward force being applied via tow bar 15 exceeds the threshold amount of force, spring 90 will be caused to extend thereby causing the rearward force to be received both by proximal end 58 of lever 56 and via (slightly extended) spring 90 at frame anchor 92. The threshold amount of rearward force will be exceeded as a function of the acceleration of vehicle 10 and trailer 20 towards each other at any given moment and the mass of trailer 20 and its contents. At and above this threshold amount of force lever 56 is caused to rotate thereby to, as will be described, apply braking to the wheels of trailer 20. Furthermore, as trailer 20 loses momentum under such braking, the force being applied rearward via tow bar 15 will accordingly reduce and will eventually drop below the threshold amount. In this way, braking subsystem 50 can again behave much as though interconnection between tow bar 15 and trailer 20 is its non-braking configuration. It will be appreciated that spring 90 can be chosen to provide a higher or lower threshold resistance based on the mass to be towed as well as the mass of the trailer itself and the existing braking power available in vehicle 10.

Figure 5:
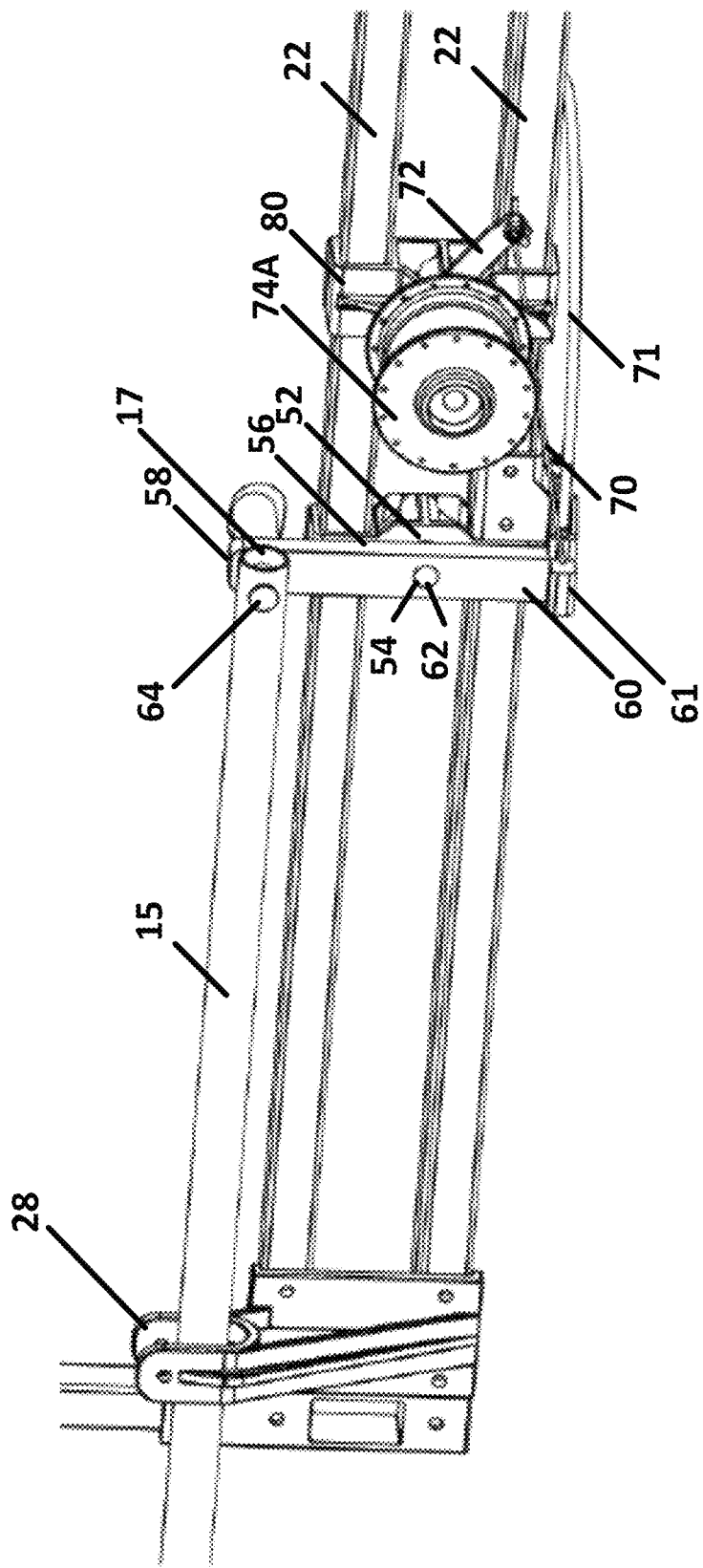
FIG. 5 is a rear perspective view of the tow bar, tow bar interface and portions of the trailer with just the hub of the left trailer wheel pictured.

FIG. 5 is a rear perspective view of tow bar 15, parts of braking subsystem 50, and portions of trailer 20 with all but wheel hub 74A of left trailer wheel 26A removed as in FIG. 4. In this Figure, spring 90, frame anchor 92 and lever extension 94 are not shown so that other components can be shown more clearly.

Figure 6:
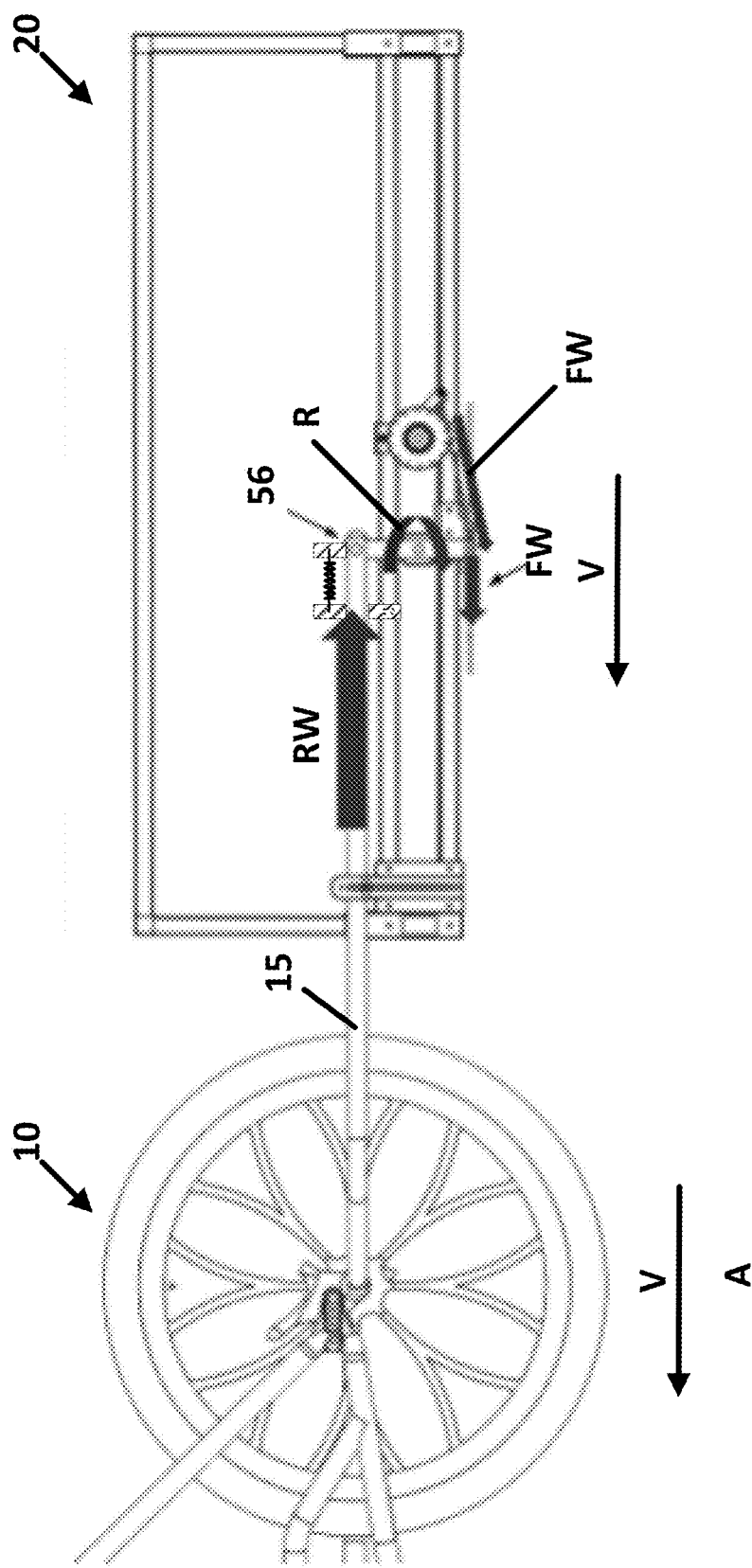
FIG. 6 is another side elevation view of the rear portion of the vehicle and connected trailer with just the hub of the left trailer wheel pictured, showing the directions of movement, velocity and acceleration of the vehicle, the tow bar and the trailer.

FIG. 6 is another side elevation view of the rear portion of vehicle 10 and connected trailer 20, showing directions of movement, velocity and acceleration of vehicle 10, tow bar 15, and trailer 20. When vehicle 10 is towing trailer 20 via tow bar 15, the assembly moves at a given velocity V in the direction shown by the arrows marked with V. Spring 90 and frame anchor 92 transmit the smaller amounts of force (those lower than the threshold amount for causing spring 90 to extend) to frame 22 so that surge braking itself is not available until the threshold amount of force is exceeded. In the event that vehicle 10 slows down rapidly relative to trailer 20, as might happen if the brakes of vehicle 10 were applied strongly and quickly, the trailer 20 will tend to continue moving forward at the rate it had been pulled by vehicle 10 via tow bar 15, while vehicle 10 decelerates. As such, trailer 20 and vehicle 10 will accelerate A towards each other. It will be appreciated that the mass of trailer 20 with its contents and the rate at which vehicle 10 decelerates in response to a user braking vehicle 10 will factor in the amount of force applied rearward RW via tow bar 15. If this amount of force exceeds the threshold amount, the force will begin to be shared between frame anchor 22 (via spring 90) and proximal end 58 of lever 56 as spring 90 extends. Lever 56 is thereby caused to rotate R with respect to connection interface 52 about fulcrum post 54 by force imparted on its proximal end 58 via tow bar 15. As this happens, distal end 60 of lever 56 will move forwardly FW, pulling brake cables 70 and 71 forwardly FW along with it. As brake cables 70 and 71 are being pulled forwardly, left and right brake base plates (base plate 72 only being shown) are accordingly pulled against their bias to apply the brakes to respective wheel hubs (wheel hub 74A only being shown). The extent to which lever 56 pivots during this surge braking is limited by the extent to which a taut brake cable and base plates are applied to respective wheel hubs. It will be appreciated that, with the configuration described herein, even if a brake cable were to snap or slip its anchoring under hard braking, or brake pads were worn down such that surge-braking power was reduced, tow bar 15 would remain interconnected with trailer 20.

FIG. 7A is a side elevation view of trailer 20 and tow bar 15 interconnected in a braking configuration during non-braking activity, and FIG. 7B is a side elevation view of trailer 20 and tow bar 15 interconnected in a braking configuration, during braking activity that causes spring 90 to extend and lever 56 to pivot about its fulcrum.

In the event that a person wishes to convert the interconnection between tow bar 15 and trailer 20 from braking configuration to non-braking configuration, at least lever 56 of braking subsystem 50 can be removed from connection post 54 so that tow bar aperture 18 of tow bar 15 can receive and retain connection post 54 directly. It will be appreciated that, in the non-braking configuration, forward and rearward forces from vehicle 10 via tow bar 15 are transmitted directly to connection interface 52 and accordingly to frame 22 of trailer 20. Use of a non-braking configuration may be useful when it is felt that trailer 20 will carry light enough loads such that added braking power in the assembly will not be required, or to enable the trailer to be towed even if repairs on certain braking components such as brake cables or pads are underway. Conversion between non-braking and braking configurations is straightforward, and may be done in a few moments.

Although embodiments have been described with reference to the drawings, those of skill in the art will appreciate that variations and modifications may be made without departing from the spirit, scope and purpose of the invention as defined by the appended claims.

For example, while in embodiments described above lever 56 is oriented at about vertical when not braking and is pushed off vertical by tow bar 15 during braking, alternatives are possible. For example, the general relative dimensions of cable and lever and tow bar in a given implementation or installation may be such that lever 56 is somewhat off vertical when not braking and is pushed towards and/or past vertical during braking. However, tow bar 15 and lever 56 should not be configured to be linearly aligned with one another while not braking. This is because tow bar 15 and lever 56 should be oriented with respect to each other so that sufficient force applied to lever 56 via tow bar 15 can always cause lever 56 to rotate and apply braking.

Furthermore, while in embodiments described herein, in the braking configuration, tow bar aperture 18 receives connection post 64 extending from proximal end 58 of lever 56. Various alternative mechanisms for interconnection may be provided. For example, rather than tow bar 15 having a tow bar aperture 18, tow bar 15 might have a tow bar post extending from the end of the tow bar (into the page, for example, in FIG. 4). In such an embodiment, accordingly the connection interface could include a connection aperture dimensioned to receive and retain the tow bar post in the non-braking configuration. Similarly, the proximal end of the lever could comprise a lever aperture dimensioned to receive and retain the tow bar post in the braking configuration. In addition, the lever fulcrum could include a fulcrum post dimensioned to be received and retained within the connection aperture in the braking configuration.

As another alternative, an alternative connection interface might include more than one connection aperture (or connection post), so that a user could switch between braking and non-braking configurations without necessarily removing the braking subsystem from the connection interface.

The braking subsystem may be provided as an add-on accessory for a trailer, such as trailer 20, that is equipped with a connection interface suitable for interconnecting the tow bar and trailer. As such, the braking subsystem may be sold separately and, if a user so wished, combined with the trailer via the connection interface to add surge-braking capabilities while also providing the ability for the user to switch between braking and non-braking configurations as described herein.

Furthermore, it will be appreciated that, in alternative embodiments, a spring providing the functionality of spring 90 could be connected to frame 22 and lever 56 in others ways. Furthermore, in an alternative embodiment, rather than an extension spring, a compression spring could be used on the opposite side of proximal end 58 of lever 56 to provide this functionality. Still further, a compression or expansion spring could be used at distal end 60 of lever 56 rather than at proximal end 58. Other configurations are possible.

What is claimed is:

1. A system for enabling a vehicle trailer and a tow bar to be interconnected in either a braking configuration or a non-braking configuration, the system comprising:
    a connection interface associated with the trailer and dimensioned to be connected with an end of the tow bar thereby to interconnect the tow bar and the trailer in the non-braking configuration; and
    a braking subsystem for interconnecting the tow bar and the trailer in the braking configuration, the braking subsystem comprising:
        a lever having a proximal end and a distal end, the lever at the proximal end dimensioned to be connected with the end of the tow bar;
        a lever fulcrum intermediate the proximal end and the distal end, the lever fulcrum dimensioned to be connected with the connection interface; and
        at least one brake associated with the distal end of the lever and with a respective wheel of the trailer,
    wherein, while the trailer and the tow bar are interconnected in the braking configuration, at least a threshold amount of rearward force imparted via the tow bar towards the proximal end of the lever causes the lever to pivot about the lever fulcrum while being retained by the connection interface thereby to move the distal end of the lever and actuate the at least one brake.

2. The system of claim 1, wherein:
    the end of the tow bar comprises a tow bar aperture;
    the connection interface comprises a connection post dimensioned to be received and retained within the tow bar aperture in the non-braking configuration;
    a lever post extends from a proximal end of the lever and is dimensioned to be received and retained within the tow bar aperture in the braking configuration; and
    the lever fulcrum comprises a fulcrum aperture dimensioned to receive and retain the connection post in the braking configuration.

3. The system of claim 1, wherein the at least one brake is connected to the distal end of the lever via a mechanical link.

4. The system of claim 1, wherein the mechanical link comprises at least one cable anchored to the distal end of the lever and to a corresponding base plate of a respective brake.

5. The system of claim 1, comprising:
    a spring associated with the lever for transmitting rearward force to the vehicle trailer and resisting pivoting of the lever about the lever fulcrum until the threshold amount of rearward force is achieved.

6. The system of claim 5, wherein the spring is associated with the proximal end of the lever.

7. The system of claim 5, wherein the spring is associated with the distal end of the lever.

8. The system of claim 6, wherein the spring is a compression spring.

9. The system of claim 6, wherein the spring is an extension spring.

10. The system of claim 1, further comprising:
    a tow bar bracket associated with the trailer for supporting the tow bar between a towing vehicle and the end of the tow bar.

11. The system of claim 1, further comprising:
    a lever stop limiting an extent of pivoting of the lever about the lever fulcrum when forward force is imparted via the tow bar to the proximal end of the lever.

12. The system of claim 1, wherein:
    a tow bar post extends from the end of the tow bar;
    the connection interface comprises a connection aperture dimensioned to receive and retain the tow bar post in the non-braking configuration;
    the proximal end of the lever comprises a lever aperture dimensioned to receive and retain the tow bar post in the braking configuration; and
    the lever fulcrum comprises a fulcrum post dimensioned to be received and retained within the connection aperture in the braking configuration.

13. A braking kit for interconnecting a tow bar and a vehicle trailer in a braking configuration, wherein the vehicle trailer comprises a connection interface dimensioned to be connected with an end of the tow bar in a non-braking configuration, the braking kit comprising:
    a lever having a proximal end and a distal end, the lever at the proximal end dimensioned to be connected with the end of the tow bar;
    a lever fulcrum intermediate the proximal end and the distal end, the lever fulcrum dimensioned to be connected with the connection interface; and
    at least one brake associated with the distal end of the lever and with a respective wheel of the trailer,
    wherein, while the trailer and the tow bar are interconnected in the braking configuration, at least a threshold amount of rearward force imparted via the tow bar towards the proximal end of the lever causes the lever to pivot about the lever fulcrum while being retained by the connection interface thereby to move the distal end of the lever and actuate the at least one brake.

14. The braking kit of claim 13, wherein:
    the end of the tow bar comprises a tow bar aperture and the connection interface comprises a connection post dimensioned to be received and retained within the tow bar aperture in the non-braking configuration;
    a lever post extends from a proximal end of the lever and is dimensioned to be received and retained within the tow bar aperture in the braking configuration; and
    the lever fulcrum comprises a fulcrum aperture dimensioned to receive and retain the connection post in the braking configuration.

15. The braking kit of claim 13, wherein the at least one brake is connectable to the distal end of the lever via a mechanical link.

16. The braking kit of claim 13, wherein the mechanical link comprises at least one cable anchorable to the distal end of the lever and to a corresponding base plate of a respective brake.

17. The braking kit of claim 13, comprising:

a spring associated with the lever for transmitting rearward force to the vehicle trailer and resisting pivoting of the lever about the lever fulcrum until the threshold amount of rearward force is achieved.

18. The braking kit of claim 17, wherein the spring is associated with the proximal end of the lever.

19. The braking kit of claim 17, wherein the spring is associated with the distal end of the lever.

20. The braking kit of claim 18, wherein the spring is a compression spring.

21. The braking kit of claim 18, wherein the spring is an extension spring.

22. The braking kit of claim 13, further comprising:

a tow bar bracket associated with the trailer for supporting the tow bar between a towing vehicle and the end of the tow bar.

23. The braking kit of claim 13, further comprising:

a lever stop for limiting an extent of pivoting of the lever about the lever fulcrum when forward force is imparted via the tow bar to the proximal end of the lever.

24. The braking kit of claim 13, wherein:

a tow bar post extends from the end of the tow bar and the connection interface comprises a connection aperture dimensioned to receive and retain the tow bar post in the non-braking configuration;

wherein the proximal end of the lever comprises a lever aperture dimensioned to receive and retain the tow bar post in the braking configuration; and wherein the lever fulcrum comprises a fulcrum post dimensioned to be received and retained within the connection aperture in the braking configuration.

* * * * *